July 8, 1924.
R. T. BOURN
POST OFFICE FURNITURE
Filed June 10, 1921 7 Sheets-Sheet 1
1,500,226
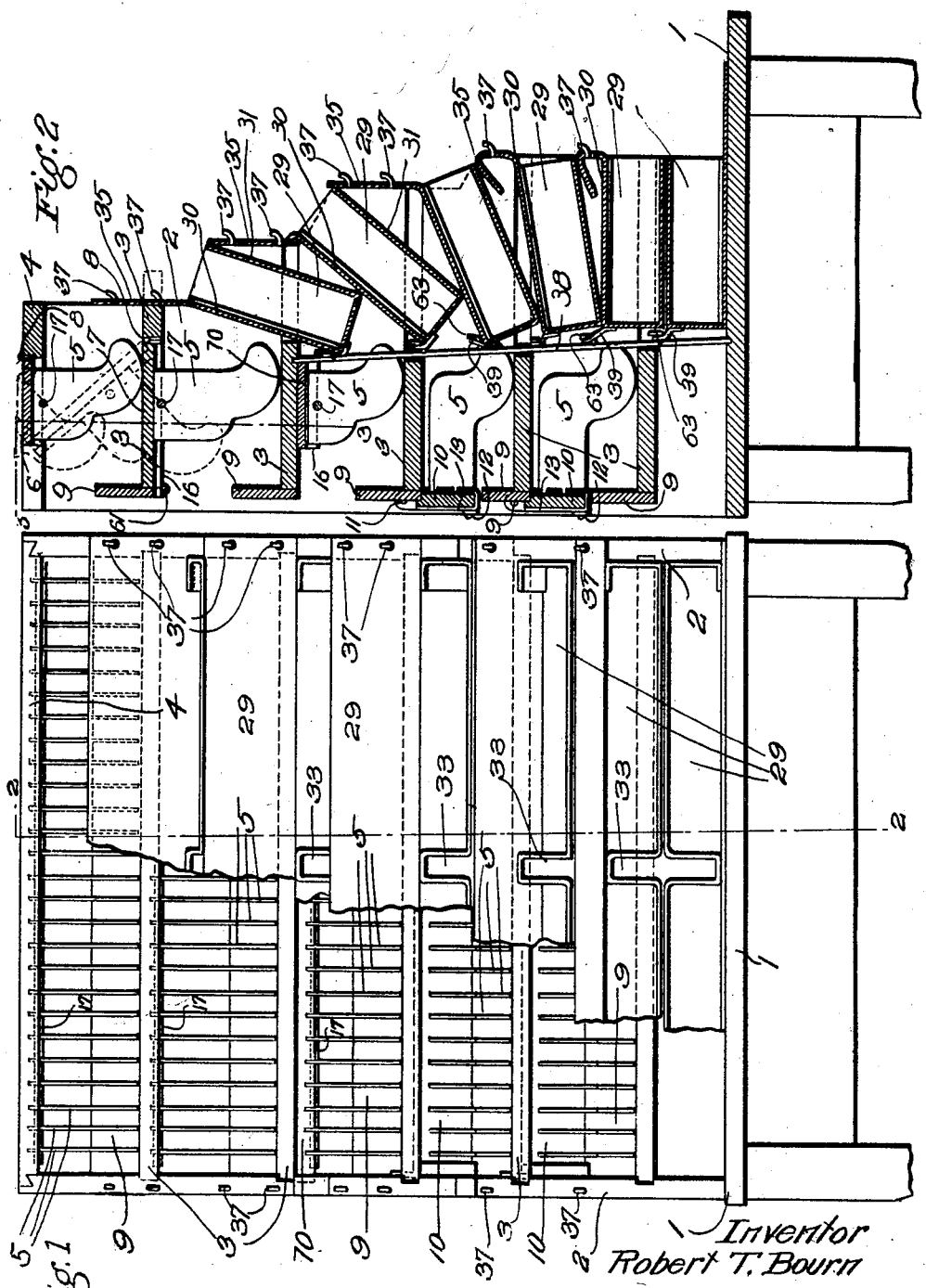

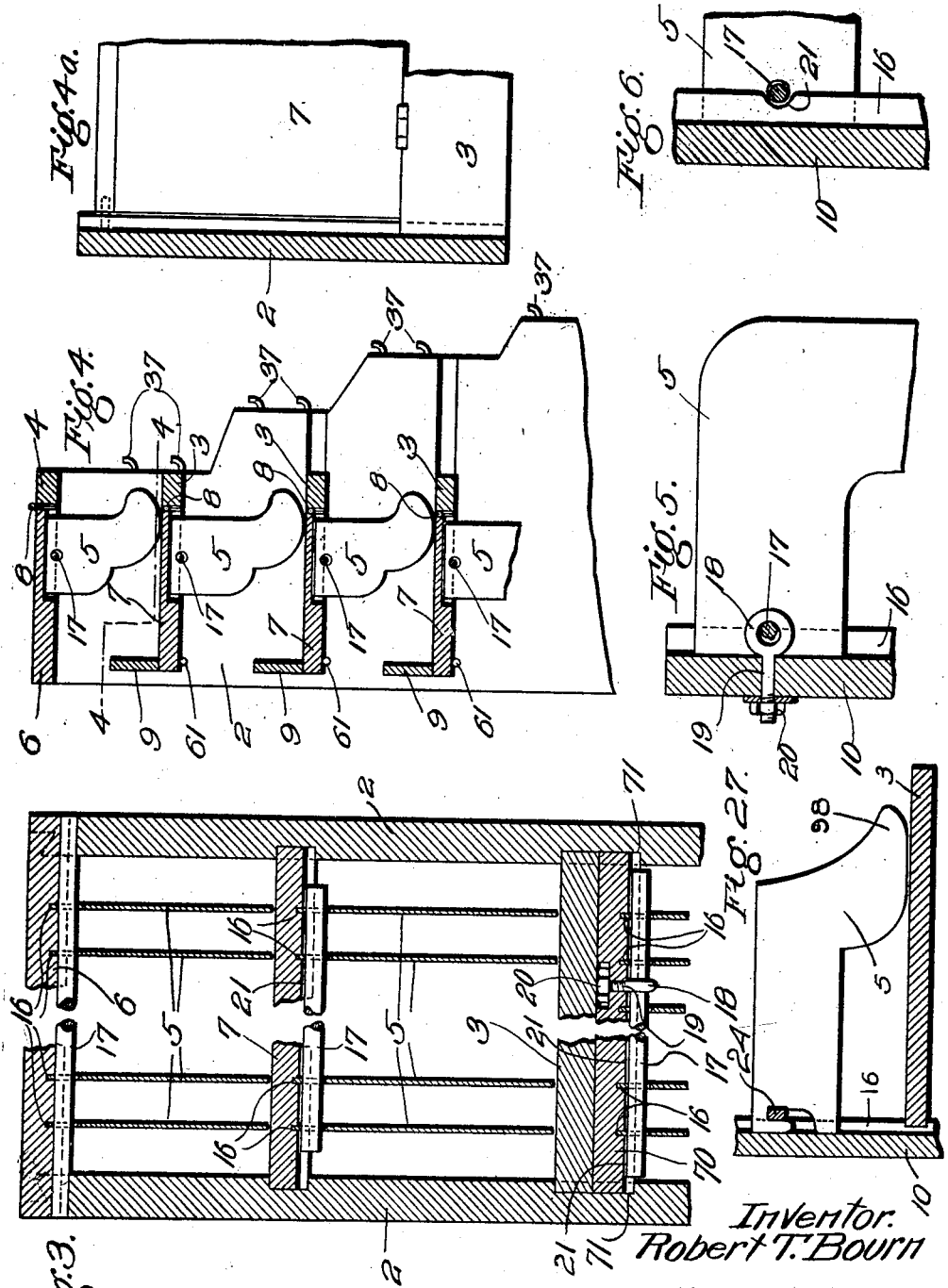

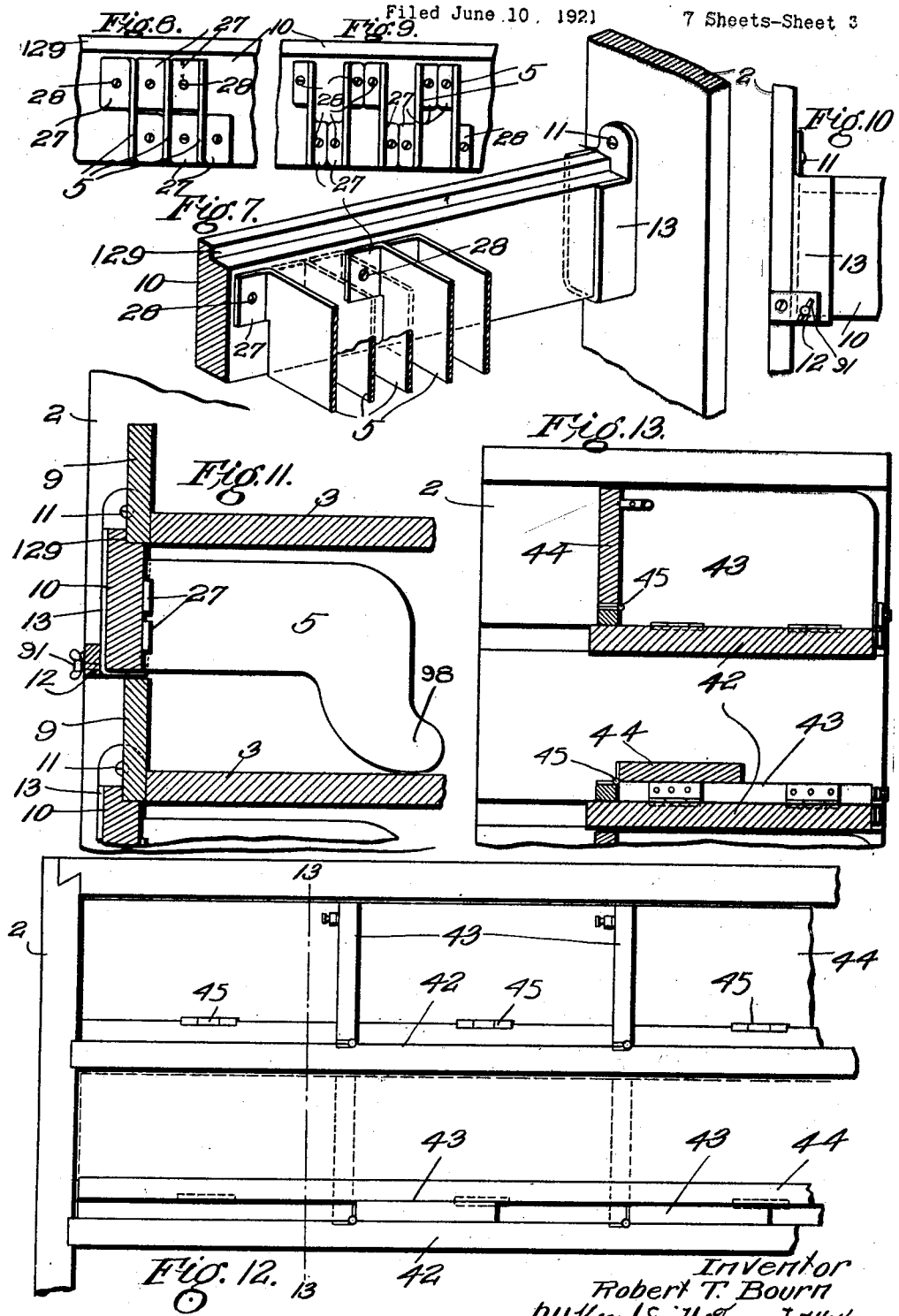

July 8, 1924.
R. T. BOURN
1,500,226
POST OFFICE FURNITURE
Filed June 10, 1921
7 Sheets-Sheet 4
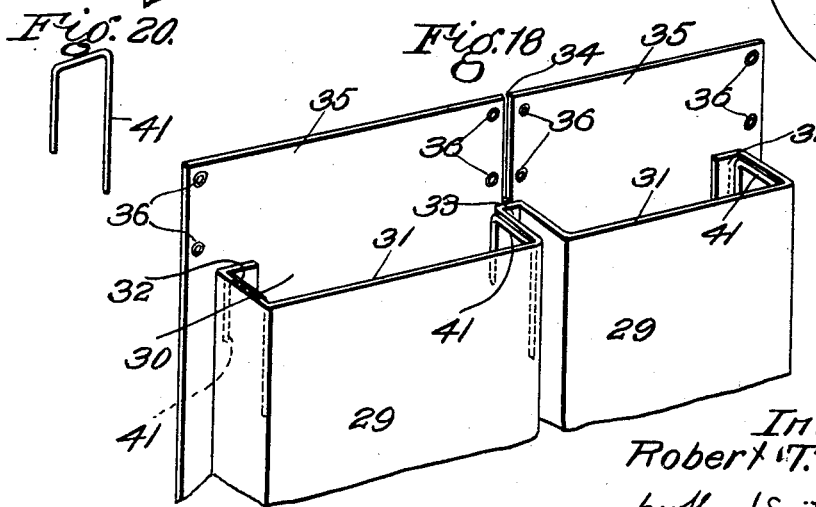

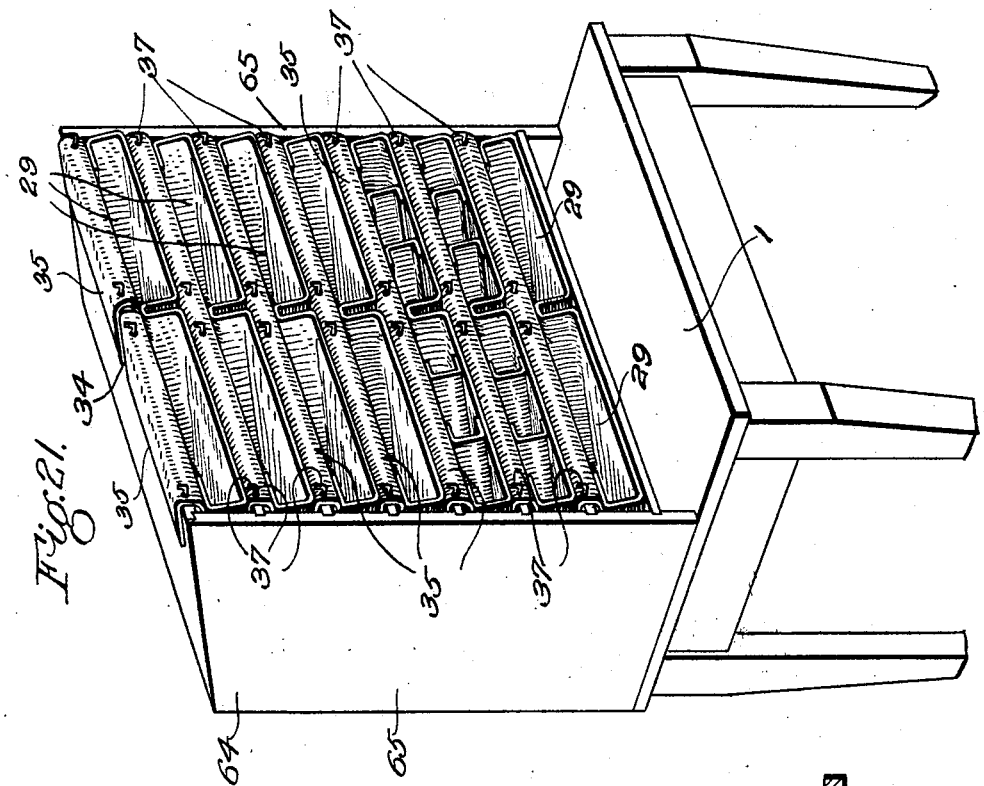
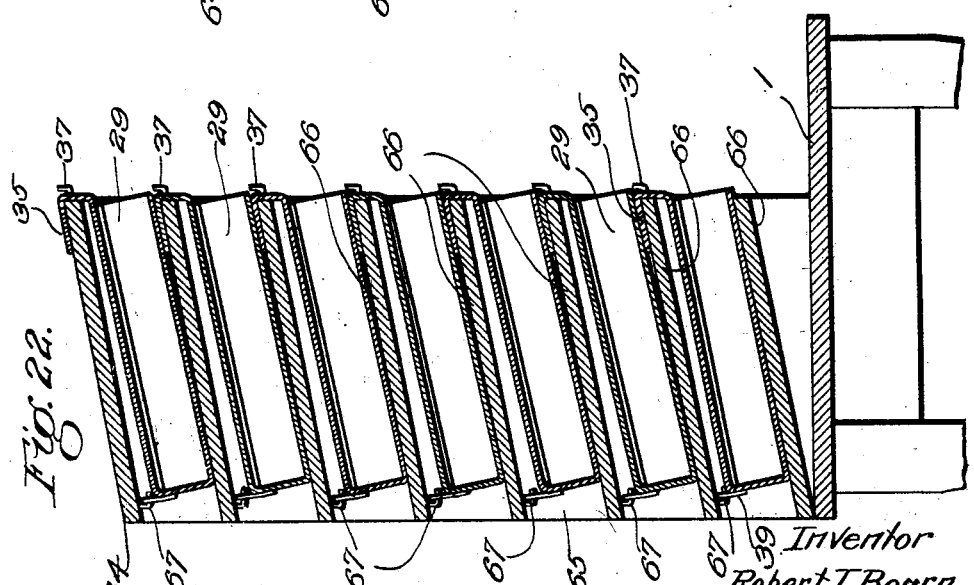

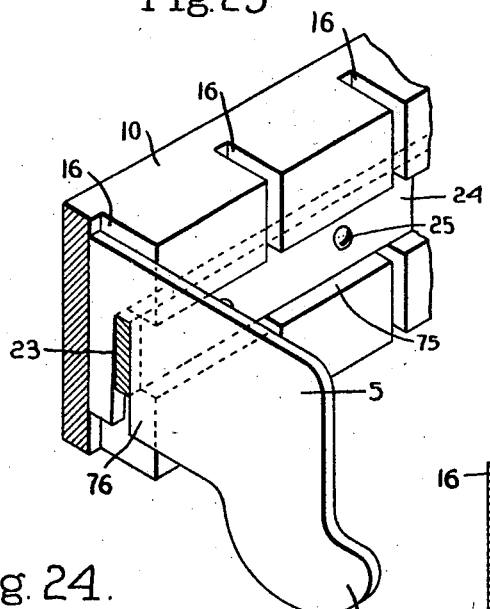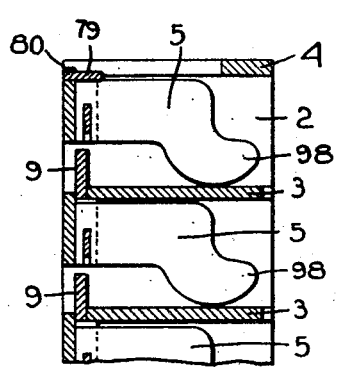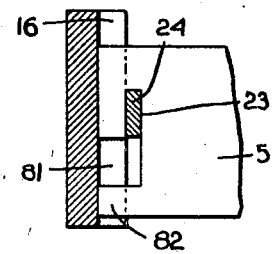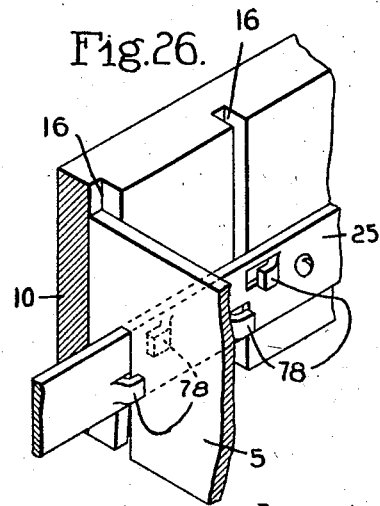

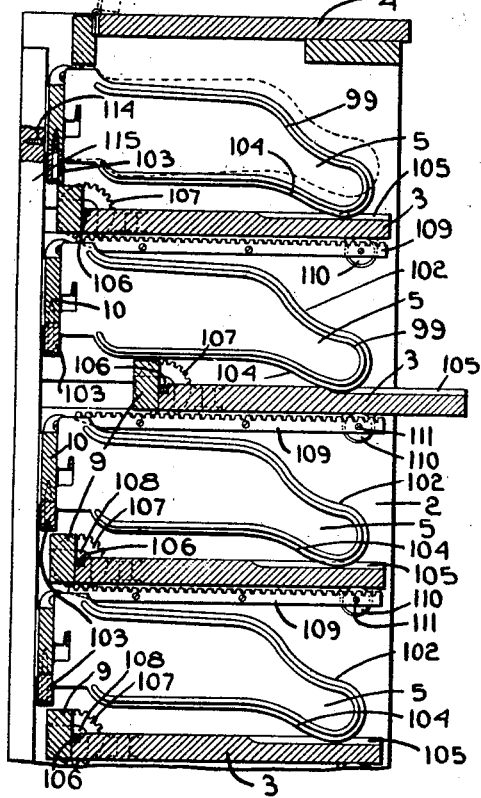
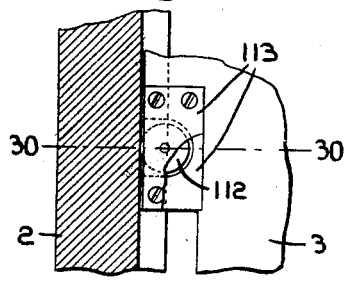
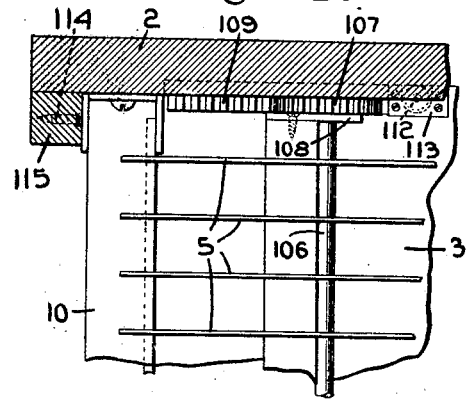
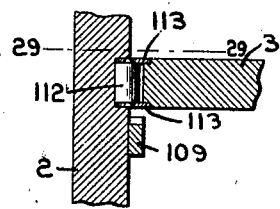
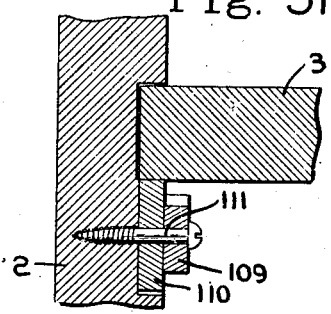

Patented July 8, 1924.

1,500,226

UNITED STATES PATENT OFFICE.

ROBERT T. BOURN, OF TEMPLETON, MASSACHUSETTS.

POST-OFFICE FURNITURE.

Application filed June 10, 1921. Serial No. 476,598.

*To all whom it may concern:*

Be it known that I, ROBERT T. BOURN, a citizen of the United States, residing at Templeton, county of Worcester, State of Massachusetts, have invented an Improvement in Post-Office Furniture, of which the following description, in connection with the accompanying drawing, is a specification, like characters on the drawing representing like parts.

This invention relates to that type of post-office furniture commonly referred to as carriers' desks and which are used by carriers to assist them in sorting their mail. The object of the invention is to provide an improved carrier's desk having various novel features which will be more fully hereinafter set forth.

In order to give an understanding of my invention, I have illustrated in the drawings some selected embodiments thereof which will now be described, after which the novel features will be pointed out in the appended claims.

In the drawings, Fig. 1 is a front view of a carrier's desk embodying my invention, said desk being equipped with one form of receptacle for holding paper mail;

Fig. 2 is a section on the line 2—2, Fig. 1;

Fig. 3 is a section on the line 3—3, Fig. 2;

Fig. 4 shows a slightly different construction from that illustrated in Fig. 1;

Fig. 4ª is an enlarged fragmentary sectional view on the line 4—4, Fig. 4.

Fig. 5 is an enlarged sectional view showing one way of attaching the partitions to a swinging back;

Fig. 6 is a section through the back shown in Fig. 5 taken between the partitions;

Fig. 7 is a perspective view showing a slightly different embodiment of the invention;

Fig. 8 is a front view of a portion of the back shown in Fig. 7 having some partitions attached thereto;

Fig. 9 is a view similar to Fig. 8 showing a different construction;

Fig. 10 is a fragmentary view showing the back side of the back illustrated in Fig. 7;

Fig. 11 is a fragmentary sectional view showing the way in which the shelves cooperate with the form of back illustrated in Fig. 7;

Fig. 12 is a fragmentary front view showing a folding paper-assorting device embodying my invention;

Fig. 13 is a section on the line 13—13, Fig. 12;

Fig. 14 is a perspective view showing one manner of securing the partitions to an overhead support;

Fig. 15 is a sectional view showing still another embodiment of the invention;

Fig. 16 is a perspective view showing still a different way of securing the partitions to their support;

Fig. 17 is a transverse section through the device shown in Fig. 16;

Fig. 18 is a perspective view of one form of folding paper receptacle;

Fig. 19 shows the receptacle of Fig. 14 in its folded condition;

Fig. 20 shows a device which may be used for holding the paper receptacle of Fig. 18 open to facilitate the insertion of papers therein;

Fig. 21 is a perspective view of a carrier's desk especially adapted for rural delivery and embodying my invention;

Fig. 22 is a vertical section through the device shown in Fig. 21;

Fig. 23 is a sectional perspective view of the back and the partitions for a shelf showing a different embodiment of my invention;

Fig. 24 is a vertical sectional view through the upper end of a routing case having the construction illustrated in Fig. 23;

Fig. 25 is a sectional view showing still a different embodiment of my invention;

Fig. 26 is a view similar to Fig. 23 but showing still another embodiment of my invention.

Fig. 27 is a view showing a different form of partition.

Fig. 27ª is a vertical sectional view through the routing case showing a different embodiment of the invention.

Fig. 28 is a section on the line 28—28, Fig. 27.

Fig. 29 is a section on the line 29—29, Fig. 30.

Fig. 30 is a section on the line 30—30, Fig. 29.

Fig. 31 is a section through one side of the case and one end of a shelf.

The carrier's desk herein illustrated is of the usual type having a table portion 1 and a routing case sustained on the table and comprising a plurality of shelves, each being partitioned off into compartments. The routing case comprises the two side members 2 which support the shelves 3, said side members being connected together at their top by a cross-piece 4. Each shelf will preferably be provided with a back stop 9 which rises a considerable distance thereabove and which prevents the letters from being forced over the back edge of the shelf.

The partitions which divide the shelves into compartments are indicated at 5, and while they may be made in any suitable way, I will preferably form them from sheet metal. The partitions for each shelf are secured to a movable support which is constructed so that its position can be shifted thereby to permit the partitions sustained therefrom to be carried away from the shelf so that the latter is free to be cleaned or removed as the case may be. In the preferred embodiment of my invention, the support for the partitions is a swinging support which by its swinging movement will raise the partitions away from the shelf. This swinging support may be either situated above the partitions, in which case the partitions will be suspended therefrom or may be at the back of the case, in which case the partitions will project forwardly therefrom.

In Fig. 2 I have shown the partitions for the two upper shelves as being suspended from overhead supports, while the partitions for the two lower shelves are secured to supports at the rear of the case. The overhead supports for the partitions may either be a portion of the shelf directly above the partitions or may be a separate member. In Figs. 2 and 4 the partitions 5 for the upper shelf are secured to a support 6 which is hinged to the cross-piece 4, as shown at 8, so that said support may be swung forwardly about its hinges 8 to carry the partitions 5 into their raised dotted line position. The advantage of mounting the support 6 so that it will swing forwardly is that such swinging movement will carry the partitions 5 upwardly and rearwardly, thus freeing them from any mail which may be on the shelf below. The back stop 9 of said shelf will prevent the mail from being disturbed by this swinging movement of the partitions. The partitions 5 for the second shelf from the top are shown in Figs. 2 and 3 as suspended from a portion 7 of the upper shelf 3, said portion 7 being hinged to the portion 3 of the shelf by means of suitable hinges 8. Thus when the partitions for the upper shelf are elevated out of the way, the swinging portion 7 of said shelf can be swung forwardly as indicated in dotted lines, Fig. 2, thus raising the partitions 5 for the second shelf free from said shelf and from any mail thereon.

This same construction is shown in Fig. 4. 61 indicate rests or stops to support the swinging portion 7 of the shelves when they are in their horizontal position. This swinging of the partitions upwardly away from the shelves not only permits the shelves to be cleaned freely, but also frees the partitions from the mail on the shelf so that the latter can be readily bundled up and removed therefrom.

The shelves are preferably slidably sustained in grooves formed in the side pieces 2 so that they can be pulled forwardly until the back stops strike the partitions. Thus the mail from any shelf can be readily removed by drawing the shelf forwardly as far as the back stop 9 will permit and then gathering up the mail. The shape of the rear edge of the partition 5 is such as to permit any shelf to be pulled well toward the front before the movement of the shelf is arrested by the back stop engaging the rear edge of the partitions.

The partitions for the third shelf from the top are shown as secured to a support 70 which is situated beneath the second shelf and has its ends received in pockets or recesses 71 formed in the side pieces 2. With this construction it will be necessary to entirely remove the second shelf before the support 70 with its attached partitions can be removed.

The partitions 5 for each of the two lower shelves in Fig. 2 are shown as connected to a support 10 which is situated at the back of the case and is pivotally connected thereto at each end, as shown at 11. These supports 10 can be swung forwardly about their pivots 11 thereby to raise the partitions from the shelf, but, of course, this swinging movement cannot be accomplished until the shelf above is removed from the case. 12 indicates stops which are secured to the sides 2 of the case and which limit the backward swinging movement of the supports 10. I may, if desired, employ adjusting screws 91 in the stops 12 to limit the extent to which the backs can swing backward and to provide an adjustment for the partitions, (see Fig. 11).

The backs 10 may conveniently be made of strips of wood to which the partitions are fastened, and these strips of wood are shown as sustained in metal holders 13 which are pivoted to the sides 2 at 11.

The metal partitions 5 may be secured to the supports in various ways without departing from my invention. In Fig. 14, which shows partitions 5 suspended from an overhead support such as 6, 7 or 70, I have illustrated the support as provided on its under face with a plurality of grooves 16 in which the ends of the partitions are received, said partitions being held in place by a retaining rod 17 which extends transversely through said partitions and is secured to the support by one or more clamping members having an eye 18 through which the rod 17 extends, and a screw-threaded shank 19 which extends through the support and on which is screw-threaded a clamping nut 20. The under face of the support is provided with a groove 21 in which the rod 17 is received and the size of the groove is such that when the clamping nuts 20 are tightened, the ends 22 of the partitions 5 will be firmly seated against the bottom of the grooves 16 before the rod 17 strikes the bottom of the groove 21. The grooves 16 prevent the partitions from moving laterally and by thus clamping the partitions firmly against the bottoms of the grooves they will all be rigidly held in place.

In Figs. 5 and 6 I have shown the same construction used for securing the partitions 5 to the supporting member 10. In Figs. 16 and 17 I have illustrated a different embodiment of the invention wherein each partition 5 is provided at its rear end with a slot 23 to receive a clamping bar 24 which is secured to the support 10 by means of suitable screws 25. This construction is such that when the screws 25 are tightened the clamping bar acts against the rear faces of the slots 23 thereby seating the ends of the partitions firmly against the bottoms of the grooves 16. The partitions will thus be rigidly and securely held in position. I propose to make each partition with a slight protuberance 26 which extends underneath the clamping bar 24 and serves to more securely hold the partitions in place. This construction has the advantage that any individual partition can be removed without disturbing the other partitions by simply loosening the screws 25 of the clamping bars sufficiently to allow the desired partition to be withdrawn. Where the rod 17 is used which extends through apertures in the partition, it will be necessary to remove the rod in order to remove any individual partition.

Another way in which these metal partitions might be secured to the supporting member is shown in Figs. 7, 8 and 9. In this construction each partition is formed at its rear end with laterally-extending lugs or ears 27 which rest against the support and which are secured thereto by suitable screws 28. These lugs will preferably be of such a length that they will constitute spacers for properly spacing the partitions from each other.

In Figs. 7 and 8 the lugs are of a width to extend from one partition to the next adjacent one, while in Fig. 9 the lugs are of a size to extend only part way from one partition to another. In this construction the partitions are spaced by the joint action of two lugs.

Where the partitions are sustained on the rear supports 10, I propose to use such supports as a stop to limit the inward movement of the shelves. As shown in Figs. 7 and 11 the upper edge of each support 10 is rabbeted, as shown at 129, and the rear end of the adjacent shelf 3 engages said rabbet when the shelf is in position. Thus the support for the partitions below any shelf constitutes a stop for said shelf.

In Fig. 15 I have shown another embodiment of the invention wherein the partitions 5 are secured to a back member 10. In this embodiment, however, the back member 10 is pivoted to the sides 2 at its lower end so that in order to raise the partitions from the shelf the back is swung backwardly. Where this construction is used for the partitions for the upper shelf, the top of the case will have an opening 62 formed therein through which the partitions may pass as they are raised from the shelf 3. The upward swinging movement of the partitions will be limited by the front end of the partitions engaging the portion 4.

The construction above described is that having to do with the sorting and routing of letter mail. In order to assist the letter carrier in sorting his paper mail, I have provided folding receptacles which may be associated with the routing case in front of the shelves 3. Such folding paper receptacles may take various forms. In Figs. 1, 2 and 18 they are shown in the form of pockets 29 made of canvas or other similar flexible material. These pockets are made in sections, one for each shelf, and each section comprises a back strip 30 of canvas adapted to extend from one side piece 2 to the other and to be detachably secured thereto. Each back strip has a front associated therewith in such a way as to form one or more pockets. In Fig. 18 this front which is indicated at 31 is sewed to the back at the ends, as shown at 32, and also at the central portion, as shown at 33, thereby making two pockets 29. The front 31 might be secured to the backs so as to make three, four or any desired number of pockets. The back strip 30 extends above the front strip and is divided between the pockets, as shown at 34, so that flap members 35 are formed which can fold over and close the open ends of the pockets. Each back is provided with eyelets 36 at its ends adapted to hook over sustaining hooks 37 that may be situated either in the front edge or just on the inside face of the two side pieces 2. I propose to use one set of pockets for each shelf and these pockets will preferably be deeper than the distance between adjacent shelves in a vertical direction. In order to accommodate these pockets, I propose to make the front edge of the side pieces 2 with the stepped arrangement shown in Figs. 2 and 4, in which case the pockets can be arranged as shown in Fig. 2. The bottom section of pockets will rest on the top of the table 1, the next section above will rest on the lower section and the other pockets will have a more or less inclined position shown. The open ends of all of the pockets are thus easily accessible to the letter carrier for inserting the paper mail therein.

To assist in holding these pockets in this position, I may employ a supporting element in the form of a pole or rod 38 which rests on the table top and has its upper end anchored in one of the shelves 3. The various pocket sections are provided at their rear ends with tabs 39 having eyelets therein which can be hooked over hooks 63 formed on the pole.

It is the intention to use these paper-receiving pockets for sorting the paper mail after the letter mail has been sorted. While the letter mail is being sorted, these paper-receiving pockets will, of course, be removed from the carrier's desk, but will be placed in the position shown in Fig. 2, after the letter mail has been properly sorted.

If the letter carrier using the desk has a rural delivery route and there is a good deal of paper mail, it may be convenient for him to use the pocket sections as a receptacle for the paper mail while the latter is being delivered.

Each pocket section when removed may be folded centrally so as to bring the pockets back to back, as shown in Fig. 19, and such receptacles will take up relatively little room in the vehicle used by the rural delivery man and can conveniently be used to store the mail during the journey.

It may be convenient to have the different pocket sections colored differently, in which case each color will represent a certain portion of the rural delivery route. By using distinguishing colors the carrier knows which pocket section contains the mail for each particular section of the route.

In order to hold the mouth of the pockets 29 open, I may secure a stiffening wire to the edge of the pocket at its mouth, or I may if desired employ U-shaped wire elements 41, such as shown in Fig. 20, which are adapted to be inserted into the mouth at each side of the pocket to hold the latter open.

In Figs. 12 and 13 I have shown another form of folding receptacle for the paper mail. This is in the form of supplemental shelves 42 adapted to be inserted into the grooves that receive the shelves 3 in front of said shelves. These supplemental shelves 42 have partitions 43 hinged thereto at proper intervals and each also has a back 44 hinged thereto, as shown at 45. The back 44 is so hinged to the shelf 42 that it can be folded down on top of the partitions 43 after the latter are folded down against the shelf, as shown at the bottom of Fig. 13. These shelves with the folding backs and partitions can be readily inserted in position in front of the shelves 3 after the letter mail has been sorted, and said shelves 42 then provide suitable compartments for receiving the paper mail as it is sorted.

In Figs. 21 and 22 I have shown a different arrangement which is especially designed for rural delivery work. This comprises a table 1 supporting a case 64 which is especially constructed to receive paper mail as well as letter mail. This case comprises the side pieces 65 and the shelves 66, said shelves preferably being arranged at a slight inclination. These shelves are adapted to receive and support flexible pockets 29, such as shown in Figs. 18 and 19. In placing these flexible pockets in position the flaps 35 will be folded over the front edge of the shelf above and will be inserted under the pockets sustained on said shelf. Thus each pocket will hold the flaps 35 of the receptacle beneath it out of the way. The tabs 39 at the rear of the pockets or receptacles are sustained on hooks 67 which serve to hold the pockets open at their lower ends. Where this device is used for a rural carrier, then when he has sorted his mail, he can simply remove the receptacles 29 from the case 64, fold the flaps 35 of the receptacles over the open ends, and then use the receptacles as containers for the mail while it is being delivered.

In Figs. 23, 24, 25, and 26 I have illustrated a construction somewhat similar to that shown in Figs. 16 and 17 but differing therefrom in some particulars. In Fig. 23 the back to which the partitions are secured is indicated at 10, and the partitions are shown at 5, said back having the grooves 16 in its front face into which the rear ends of the partitions are received. The partitions are formed with the slot 23 to receive the clamping bar 24, all as illustrated in Fig. 16.

In the embodiment shown in Fig. 23, however, the back 10 is provided with a groove 75 extending longitudinally thereof on its front face in which the clamping bar 24 is received. By means of this construction the portion 76 of each partition immediately in front of the slot 23 is received within the groove or slot 16 in the back, and, therefore, the partition is braced by the walls of the groove 16 in front of the slot at both the top and the bottom. In the construction shown in Fig. 16, where the slot 23 is situated entirely in front of the back 10, the resistance to any twisting movement of the partition is only that afforded by the material between the top of the slot and the top of the partition, but with the construction shown in Fig. 23, where the body of the partition in front of the slot is received within the groove 16, the partition is braced from top to bottom against any twisting or lateral movement.

In Fig. 26 I have shown a slightly different embodiment of the invention wherein the clamping bar 24 is provided with fingers 78 that are struck up therefrom and which engage the partition 5 in front of the clamping bar. These fingers 78 act to brace the partition against lateral or twisting movement in the same way that the engagement of the walls of the slots 16 with the portion 76 of the partitions do.

The construction shown in Figs. 23 and 26 have the advantage that any partition may be removed without loosening the clamping bar 24. The rear wall of the slots 23 are made slightly tapering so that when each partition is forced into its operative position, shown in Fig. 23, the portion between the slot and the rear edge of the partition will be frictionally held between the clamping bar 24 and the bottom of the slot. By striking the partition a light blow on its under edge it will be loosened and can then be removed without loosening the clamping bar 24.

In the construction shown in Fig. 24 and in some of the other figures I have shown an arrangement where the upper edge of the partition is situated quite close to the shelf above and in this construction each shelf operates as a means for holding the partitions for the shelf below in their proper position. The partitions 5 for the upper shelf are held in place by means of a retaining strip 79 which extends from one side 2 to the other and is removably secured in position by means of screws 80.

In Fig. 25 I have illustrated an embodiment of my invention wherein the slot 23 opens at the rear end of the partition instead of at the bottom. In this construction the slot 23 has the rearwardly extending portion 81 which is wide enough to receive the clamping bar 24. This form of slot provides a portion 82 of the partition below the slot which enters the groove 16 and which co-operates to hold the partition against any twisting or lateral movement.

The form of slot shown in Figs. 27 and 25 has the advantage that both the lower and the upper edge of the partition is supported in the groove 16.

In the different embodiments of the invention shown each partition is formed with the nose portion 98 which extends forwardly from the body of the partition and which adds length to the partition as well as furnishing means for guiding the letters into the compartments. If desired, the tips or noses of the partitions forming different sections of the route may be provided with different colors thus constituting eye guides to assist the carrier in sorting the mail. In Fig. 27$^a$ I have shown a construction wherein the partitions are formed with strengthening ribs 99.

In the construction shown in Fig. 27$^a$ the back stop 9 at the rear of the shelf 3 is relatively low and each partition is formed with the inclined portion 104 at its under edge which is indicated by the back stop 9 as the shelf is withdrawn. The inclination of the portion 104 is such that the back stop will raise the partitions automatically as the shelf is withdrawn thus permitting the shelf to be entirely removed from the case without disturbing the partitions. Where a low back stop 9 is employed I may, if desired, provide the supports 10 with the extensions 103. In this construction, shown in Fig. 27$^a$ the shelves are provided with a groove 105 in which the front ends of the partitions normally rest, this construction having the advantage that the grooves serve to prevent the partitions from moving laterally at their front ends.

Each partition is also shown as having the inclined portion 102 on its upper edge at the front which serves as a guide to turn the letters in upright position as they are inserted into the compartments.

Each shelf has also journalled therein a shaft 106 which extends from one end to the other thereof and which has fast thereon at each end a gear 107 meshing with a rack 109 secured to the side 2 of the case. The purpose of this construction is to prevent the shelf from binding or cramping as it is withdrawn. The provision of these racks and gears insures that both ends of the shelves must of necessity move together and prevents one end from advancing ahead of the other thereby causing binding.

Each shelf is supported at its front end on a guide roll 110 which is situated in a recess in the side 2 of the case and which is shown as journalled on a screw 111 which holds the rack 109 in place. Each shelf is also provided at its edge with an anti-friction roll 112 which engages the bottom of the groove in the side of the case and which is journalled in plates 113 carried by the shelf.

I claim:—

1. In post-office furniture, the combination with a routing case having shelves divided by partitions into compartments for receiving letter mail, of a plurality of receptacles to receive bulky mail as it is sorted, and means for supporting said receptacles on the routing case in front of the shelves.

2. In post-office furniture, the combination with a routing case having shelves divided by partitions into compartments for receiving letter mail, of a plurality of foldable receptacles to receive bulky mail as it is sorted, and means for supporting said receptacles on the routing case in front of the shelves.

3. In post-office furniture, the combination with a routing case comprising two side members and partitioned shelves sustained thereby for receiving letter mail, of a plurality of receptacles for paper mail, and means for supporting said receptacles on said side members in front of said shelves.

4. In post-office furniture, the combination with a routing case having shelves divided by partitions into compartments for receiving letter mail, of a plurality of receptacles to receive bulky mail as it is sorted, and means for removably supporting said receptacles on said routing case in front of said shelves.

5. In post-office furniture, the combination with a routing case comprising two side members and partitioned shelves sustained thereby for receiving letter mail, of a plurality of foldable receptacles for paper mail, and means for supporting said receptacles on said side members in front of said shelves.

6. In post-office furniture, the combination with a routing case having shelves divided by partitions into compartments for receiving letter mail, of a plurality of separate foldable receptacles to receive bulky mail, and means to support said receptacles separately on the routing case in front of the shelves.

7. In post-office furniture, the combination with a case or support, of a plurality of bag-like receptacles each open at one end and each having one side thereof extended beyond the opening to form a flap which is adapted to fold over the opening and cover the latter, means on the case for supporting each receptacle at the bottom and also for detachably engaging the flap of each receptacle, thereby to support the receptacle in position to receive mail and to hold the flap in open position.

8. In post-office furniture, the combination with a case or supporting frame, of a plurality of bag-like receptacles each divided into compartments and each having an open end, and also having one side extended beyond the open end to form flaps to cover said compartments, means on the case to support the bottom of each receptacle and also to detachably engage the flaps, thereby to hold the receptacles in proper position with the flaps open.

9. In post-office furniture, the combination with a case or frame, of a plurality of bag-like receptacles divided into compartments, each receptacle having a tab at its bottom and flaps to cover each compartment, and means on the case to engage the tab and flaps of the various receptacles to support them in open position one above the other.

10. In post-office furniture of the routing case type, the combination with side members, of a cross-piece connecting the upper ends of said side members at the front, a supporting member hinged to the rear edge of said cross-piece, and partitions suspended from the hinged supporting member.

11. In post-office furniture, the combination with a routing case frame, of a shelf removably carried thereby, a partition-supporting member situated above the shelf, means supporting said member to permit it to swing upwardly and forwardly, and partitions secured to and depending from the said supporting member.

12. In a routing case, the combination with a frame, of a shelf carried thereby, a partition-supporting member hinged to the frame above the shelf so as to swing upwardly and forwardly relative to the shelf, and partitions secured to said supporting member.

13. In a routing case, the combination with a frame, of a shelf carried thereby, a partition-supporting member situated above the shelf and provided with grooves, partitions having their ends seated in said grooves, and a device acting on all the partitions and constructed to clamp the ends thereof against the bottom of the grooves.

14. In a routing case, the combination with a partition-supporting member having partition-receiving grooves, of a plurality of partitions having their ends seated in said grooves, each partition having an opening, a clamping member extending through the openings of all the partitions, and means acting on said clamping member and drawing it towards the support thereby seating the ends of the partitions firmly against the bottoms of the grooves.

15. In post-office furniture, the combination with a routing case having two side members, of a plurality of partition-supporting members hinged thereto, partitions secured to said partition-supporting members, and shelves co-operating with said partitions, the upper edge of each partition-supporting member constituting a back stop for the shelf next above.

16. In post-office furniture, the combination with a frame, of shelves carried thereby, a partition-supporting member extending longitudinally of each shelf above the latter, each member having partition-receiving grooves therein, a clamping bar secured to each member, partitions having their rear ends inserted in the grooves in the partition-supporting members, each partition having a finger to enter behind the clamping bar.

17. In post-office furniture, the combination with a frame, of shelves carried thereby, a partition-supporting member secured to the frame above each shelf, each member having partition-receiving grooves therein, a clamping bar secured to each member, partitions having their rear ends inserted in the grooves in the partition-supporting members, each partition having a slot to receive the clamping bar, each slot opening through the rear of the partition so that the partitions may be independently removed.

In testimony whereof, I have signed my name to this specification.

ROBERT T. BOURN.